US012442399B2

(12) United States Patent
Adachi et al.

(10) Patent No.: US 12,442,399 B2
(45) Date of Patent: Oct. 14, 2025

(54) CLIP, COVER-MEMBER ATTACHMENT TOOL, AND CLIP ASSEMBLY

(71) Applicant: YKK Corporation, Tokyo (JP)

(72) Inventors: Takefumi Adachi, Tokyo (JP); Yusuke Nakagawa, Tokyo (JP)

(73) Assignee: YKK Corporation, Tokyo (JP)

(*) Notice: Subject to any disclaimer, the term of this patent is extended or adjusted under 35 U.S.C. 154(b) by 198 days.

(21) Appl. No.: 18/456,843

(22) Filed: Aug. 28, 2023

(65) Prior Publication Data

US 2024/0077095 A1    Mar. 7, 2024

(30) Foreign Application Priority Data

Sep. 2, 2022 (JP) ................. 2022-139835

(51) Int. Cl.
| F16B 2/20 | (2006.01) |
| A47C 31/02 | (2006.01) |
| F16B 2/22 | (2006.01) |
| B60N 2/58 | (2006.01) |
| B60N 2/60 | (2006.01) |

(52) U.S. Cl.
CPC .............. *F16B 2/22* (2013.01); *A47C 31/023* (2013.01); *B60N 2/5825* (2013.01); *B60N 2/6027* (2013.01)

(58) Field of Classification Search
CPC ....... F16B 2/22; A47C 31/023; B60N 2/5825; B60N 2/6027
See application file for complete search history.

(56) References Cited

U.S. PATENT DOCUMENTS

| 9,896,008 B2* | 2/2018 | Sato .................... B60N 2/5825 |
| 2019/0104859 A1 | 4/2019 | Murasaki et al. |
| 2021/0053472 A1* | 2/2021 | Eldridge .............. A47C 31/023 |

FOREIGN PATENT DOCUMENTS

| JP | 2011-069417 A | 4/2011 |
| KR | 10-2138612 B1 | 7/2020 |

OTHER PUBLICATIONS

Office Action, Korean Patent Application No. 10-2023-0114503, Nov. 25, 2024, 11 pages.

* cited by examiner

*Primary Examiner* — Syed A Islam
(74) *Attorney, Agent, or Firm* — Kilpatrick Townsend & Stockton LLP

(57) ABSTRACT

A clip includes a first guide and a second guide each configured to guide an engagement portion of a suspender to a gap formed therebetween, at least one of the first guide or the second guide being engageable with the engagement portion inserted through the gap, and a connecting portion connecting the first guide and the second guide to each other. The first guide and the second guide are each placed on a bottom surface of a groove of a cushion member.

11 Claims, 15 Drawing Sheets

CLIP, COVER-MEMBER ATTACHMENT TOOL, AND CLIP ASSEMBLY

CROSS REFERENCE TO RELATED APPLICATIONS

The present application claims priority to Japanese Patent Application No. 2022-139835 filed Sep. 2, 2022 with the Japanese Patent Office, the entire contents of which are expressly incorporated by reference herein.

TECHNICAL FIELD

The present invention relates to a clip, a cover-member attachment tool, and a clip assembly that are used for attaching a cover member to a cushion member.

BACKGROUND ART

Conventionally, many seats, chairs, and the like are equipped with cushion members having surfaces covered with cover members. These cushion members are placed on areas, such as seat surfaces or backrests, that come into contact with human bodies, and there is known a cover-member attachment tool as means for attaching a cover member to a cushion member.

For example, a cover-member attachment tool disclosed in Patent Literature 1 (JP 2011-69417 A) includes a clip that is configured to be disposed in a groove of a cushion member and a suspender that is configured to be attached to the cover member. The cover member can be attached to the cushion member by engaging the suspender and the clip with each other. This clip includes a base provided at the bottom surface of the groove, a pair of legs each vertically disposed on the base, and a pair of guides projecting toward each other from the pair of legs. The suspender is guided by the pair of guides and accommodated in a space between the pair of legs, so that the suspender and the clip engage each other.

However, the clip of the cover-member attachment tool disclosed in Patent Literature 1 has an accommodation space formed therein for the suspender, and thus, it is difficult to reduce the dimension of the clip in a depth direction of the groove of the cushion member. Thus, for example, when the groove of the cushion member is shallow, it is difficult to dispose the clip or the suspender engaged with the clip at a position sufficiently spaced apart from the opening of the groove, which may sometimes cause a user to feel the presence of these members in the cushion member.

SUMMARY OF THE INVENTION

An object of the invention is to provide a clip, a cover-member attachment tool, and a clip assembly capable of reducing the likelihood that a user will feel their presence.

First Aspect

A first aspect of the invention is a clip configured to be placed in a groove of a cushion member, the clip including a first guide and a second guide configured to guide a suspender configured to be attached to a cover member to a gap formed between the first guide and the second guide, at least one of the first guide or the second guide being engageable with an engagement portion of the suspender inserted through the gap and a connecting portion connecting the first guide and the second guide to each other, in which the first guide and the second guide are each placed on a bottom surface of the groove.

With such a configuration, there is no need to form an accommodation space for the suspender inside the clip, and an increase in the dimension of the clip in the depth direction of the groove of the cushion member can be suppressed. Thus, even in the case where the groove of the cushion member is shallow, the clip or the suspender engaged with the clip can be disposed at a position sufficiently spaced apart from the opening of the groove. As a result, the likelihood that a user will feel the presence of the clip or the suspender in the cushion member can be reduced.

Second Aspect

In the first aspect of the invention, it is preferable that the bottom surface of the groove be exposed through the gap between the first guide and the second guide.

With such a configuration, an increase in the dimension of the clip in the depth direction of the groove of the cushion member can be appropriately suppressed.

Third Aspect

In the first aspect or the second aspect of the invention, it is preferable that the first guide include a tongue that is elastically deformable toward the bottom surface of the groove and that the tongue have an end surface facing an edge portion of the second guide with the gap interposed therebetween.

With such a configuration, when the engagement portion of the suspender is inserted through the gap between the first guide and the second guide, the tongue is elastically deformed by being pressed by the suspender, so that the gap expands, and thus, the engagement portion may be easily inserted through the gap. In addition, after the engagement portion has passed through the gap between the first guide and the second guide, the tongue returns to its original shape and presses the suspender toward the second guide, and thus, the engagement portion and the second guide may be easily engaged with each other.

Fourth Aspect

In the third aspect of the invention, it is preferable that a dimension of the end surface of the tongue in a depth direction of the groove be larger than a dimension of the edge portion of the second guide in the depth direction of the groove.

With such a configuration, after the engagement portion of the suspender has passed through the gap between the first guide and the second guide, the end surface of the tongue can appropriately apply pressure to the suspender toward the second guide.

Fifth Aspect

In any one of the first aspect to the fourth aspect of the invention, it is preferable that the connecting portion be formed as a pair of bridges each extending across the gap between the first guide and the second guide and that the first guide, the second guide, and the pair of bridges define a through hole in a depth direction of the groove.

With such a configuration, since the gap between the first guide and the second guide is formed as the through hole, an unintentional expansion of the gap can be suppressed, and the state of the suspender being engaged with the clip can be appropriately maintained.

Sixth Aspect

It is preferable that the clip according to any one of the first aspect to the fifth aspect of the invention further include a first leg connected to the first guide and extending toward a side on which the groove is open, a second leg connected to the second guide and extending toward the side on which the groove is open, a first claw projecting from an end of the first leg toward the second leg, and a second claw projecting from an end of the second leg toward the first leg.

With such a configuration, when the cushion member is formed, the first claw and the second claw can hold a trench that corresponds to the groove. As a result, mounting of the clip onto the trench can be easily performed. In other words, the clip can be easily installed in the cushion member.

Seventh Aspect

A cover-member attachment tool according to a seventh aspect of the invention includes the clip according to any one of the first aspect to the sixth aspect and the suspender configured to be attached to the cover member, in which the suspender includes a body that is insertable through the gap between the first guide and the second guide and the engagement portion projecting from the body in a width direction of the groove and that is engageable with at least one of the first guide or the second guide.

With such a configuration, as mentioned above, the likelihood that a user will feel the clip or the suspender in the cushion member can be reduced.

Eighth Aspect

In the seventh aspect of the invention, it is preferable that the engagement portion project from the body toward one side in the width direction of the groove and be inserted between the second guide and the bottom surface of the groove.

With such a configuration, by tilting the suspender and pulling it out of the clip, engagement of the engagement portion with the second guide can be released. This facilitates repair of the cover member.

Ninth Aspect

In the seventh aspect or the eighth aspect of the invention, it is preferable that the suspender further include a projection projecting from the body and that is configured to be brought into contact with the clip from a side on which the groove is open.

With such a configuration, the likelihood that the suspender will be excessively inserted into the clip is reduced, so that breakage of the cushion member can be suppressed.

Tenth Aspect

A clip assembly according to a tenth aspect of the invention includes a plurality of the clips according to any one of the first aspect to the sixth aspect that are arranged in a predetermined direction and a clip connecting portion connecting the plurality of clips to each other.

Such a configuration can obtain advantageous effects similar to those of the first aspect.

Eleventh Aspect

A cover-member attachment tool according to an eleventh aspect of the invention includes the clip assembly according to the tenth aspect and a suspender assembly configured to be attached to the cover member, in which the suspender assembly includes a plurality of the suspenders corresponding to respective ones of the plurality of clips.

Such a configuration can obtain advantageous effects similar to those of the first aspect.

DETAILED DESCRIPTION

First Exemplary Embodiment

A first exemplary embodiment of the invention will be described below with reference to FIG. 1 to FIG. 10.

Figure 1:
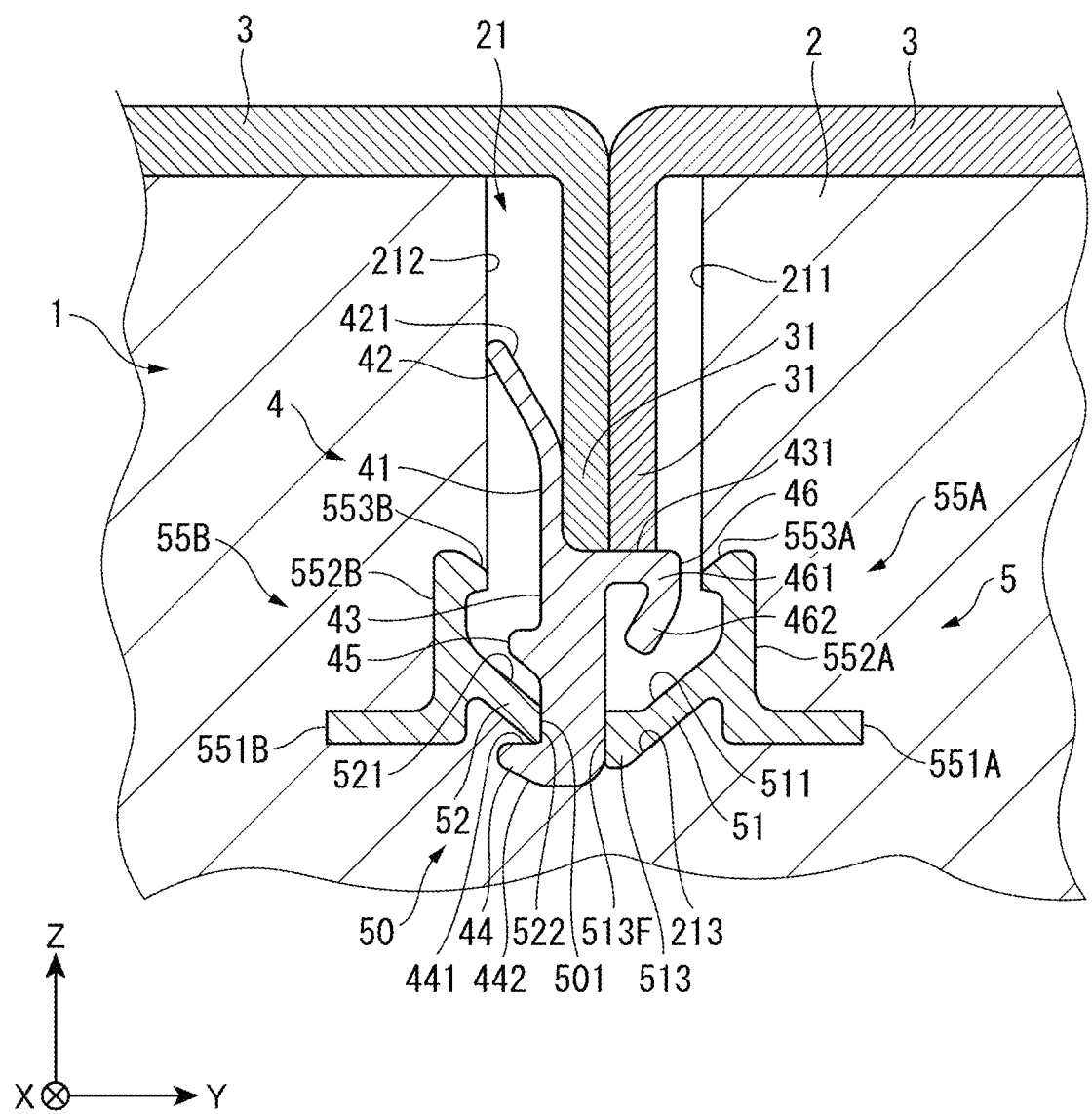
FIG. 1 is a cross-sectional view illustrating a state where a cover-member attachment tool according to a first exemplary embodiment of the invention is installed in a cushion member.

As illustrated in FIG. 1, a cover-member attachment tool 1 according to the first exemplary embodiment is used for attaching at least one cover member 3 to a cushion member 2 of a vehicle seat or the like. The cover-member attachment tool 1 includes a suspender 4 that is configured to be attached to the cover member 3 and a clip 5 that is configured to be placed in a groove 21 of the cushion member 2, and the cover member 3 can be attached to the cushion member 2 by engaging the suspender 4 and the clip 5 with each other.

The cushion member 2 is made of a synthetic resin urethane foam material, such as foamed polyurethane, formed in the shape of a seat. The cushion member 2 has the groove 21 in which the clip 5 is configured to be placed. The groove 21 has an opening at the surface of the cushion member 2 and extends in a predetermined direction along the surface of the cushion member 2. In addition, the cushion member 2 has a first side wall surface 211, a second side wall surface 212, and a bottom surface 213 that define the groove 21, the first side wall surface 211 and the second side wall surface 212 facing each other.

The cover member 3 is a sheet that covers the surface of the cushion member 2 and is, for example, a synthetic resin fabric sheet. End edge portions 31 of the cover member 3 are attached to the suspender 4 by, for example, sewing.

The configuration of the cover-member attachment tool 1 will now be described with reference to FIG. 1 to FIG. 5.

In the following description of the configuration of the cover-member attachment tool 1, assuming the state where the suspender 4 and the clip 5 are engaged with each other as a reference state, three axial directions that are the X-axis direction, the Y-axis direction, and the Z-axis direction are used (see FIG. 1). For example, a length direction of the cover-member attachment tool 1 corresponds to the X-axis direction. The transverse direction of the cover-member attachment tool 1 corresponds to the Y-axis direction. The vertical direction of the cover-member attachment tool 1 corresponds to the Z-axis direction. Note that, in the state where the cover member 3 is attached to the cushion member 2 by using the cover-member attachment tool 1 (see FIG. 1), the X-axis direction corresponds to a length direction of the groove 21 of the cushion member 2, the Y-axis direction corresponds to a width direction of the groove 21, and the Z-axis direction corresponds to a depth direction of the groove 21. In addition, for convenience of description, the direction toward one side (the upper side) of the Z axis will be referred to as a positive-Z-axis-direction, and the direction toward the other side (the lower side) of the Z axis will be referred to as a negative-Z-axis direction. In the cushion member 2, the groove 21 is open in the positive-Z-axis-direction.

Figure 2:
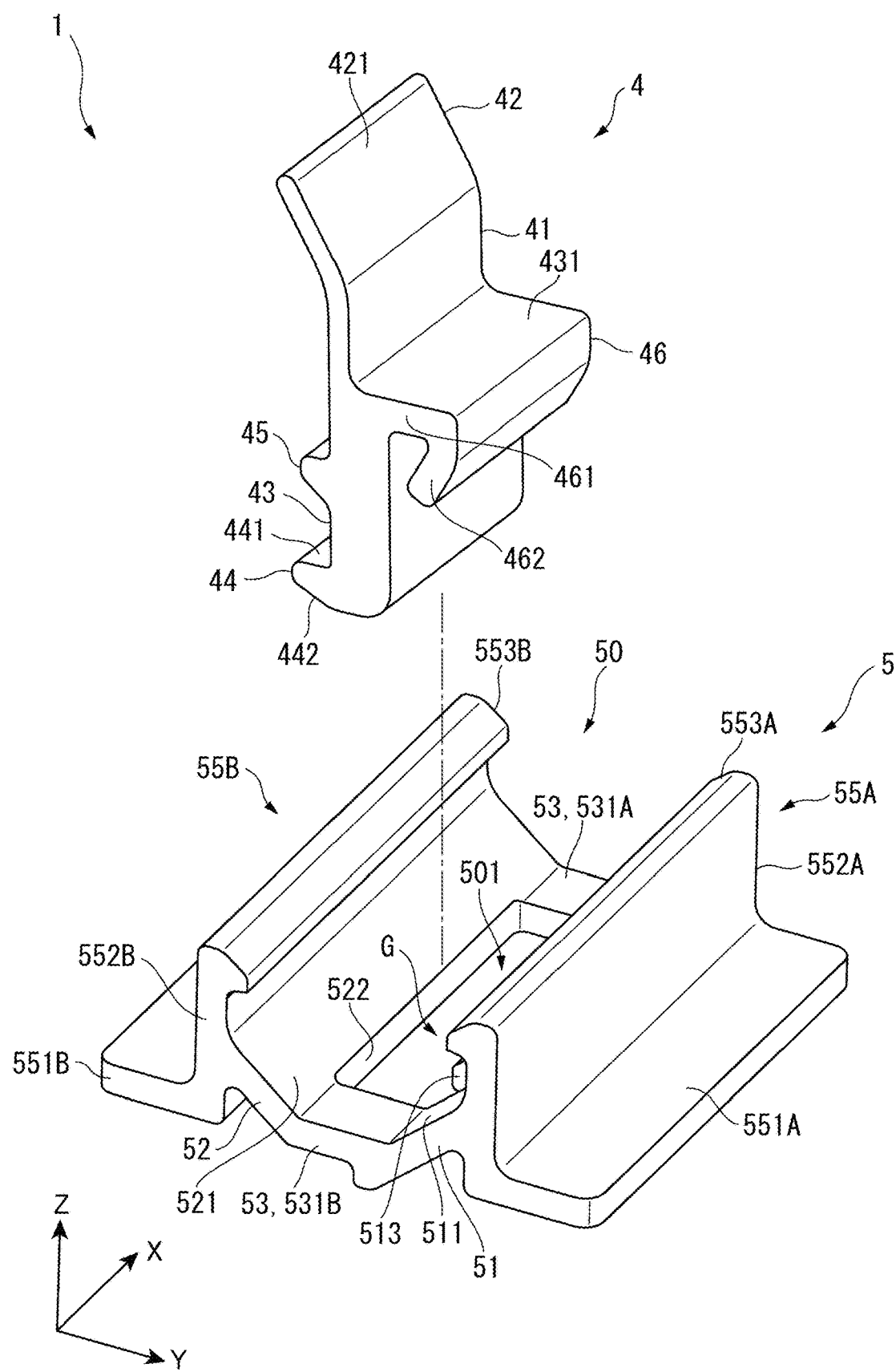
FIG. 2 is an exploded perspective view illustrating the cover-member attachment tool of the first exemplary embodiment.

The suspender 4 is a molded product made of, for example, a thermoplastic resin such as polypropylene and is suspended from the end edge portions 31 of the cover member 3. Specifically, as illustrated in FIG. 1 and FIG. 2, the suspender 4 includes an attachment portion 41 to which the end edge portions 31 of the cover member 3 are attached, an inclined portion 42 connected to an end portion of the attachment portion 41 on the positive Z-axis side, a body 43 connected to an end portion of the attachment portion 41 on the negative Z-axis side, an engagement portion 44 and a projection 45 each projecting from the body 43 toward one side of the Y-axis direction (e.g., a negative Y-axis side), and a jig hook 46 projecting from the body 43 toward the other side of the Y-axis direction (e.g., a positive Y-axis side).

The attachment portion 41 has a plate-like shape extending along an XZ plane. Each of end edge portions 31 of two cover members 3 is placed onto surface of the attachment portion 41 on the positive Y-axis side, and the attachment portion 41 and the end edge portions 31 of the cover members 3 are sewn together.

The inclined portion 42 extends from the attachment portion 41 in a direction inclined with respect to the Z-axis direction and has an inclined surface 421 facing the positive Y-axis side and the positive Z-axis side. The inclined portion 42 is elastically deformable by receiving, at the inclined surface 421, a pressure that is applied to the surface of the cushion member 2.

The body 43 has a plate-like shape extending along the XZ plane. The dimension of the body 43 in the Y-axis direction is larger than the dimension of the attachment portion 41 in the Y-axis direction. Thus, the body 43 forms, together with the jig hook 46, a pressing surface 431 facing the positive-Z-axis direction.

The engagement portion 44 projects toward the negative Y-axis side from an end portion of the body 43 on the negative Z-axis side. The engagement portion 44 has an engaging surface 441 facing the positive Z-axis side and a to-be-guided surface 442 facing the negative Z-axis side. The to-be-guided surface 442 is inclined with respect to the Y-axis direction in a manner to be closer to the positive Z-axis side as an increasing distance in the negative-Y-axis direction.

The projection 45 projects toward the negative Y-axis side from a position on the body 43, the position being located toward the positive Z-axis side with respect to the engagement portion 44. There is a gap formed between the engagement portion 44 and the projection 45 in the Z-axis direction, and the gap is equal to or larger than the dimension in the Z-axis direction of a second guide 52 (or a first guide 51) of the clip 5, which will be described later.

The jig hook 46 includes an arm piece 461 projecting toward the positive Y-axis side from a base end of the body 43 on the positive Z-axis side and a hook piece 462 extending, while being curved, from the arm piece 461 toward the negative Z-axis side. A jig that is used for separating the suspender 4 from the clip 5 can be inserted into a space formed between the hook piece 462 and the body 43.

The clip 5 is a molded product made of, for example, a thermoplastic resin such as polypropylene. Specifically, as illustrated in FIG. 1 to FIG. 5, each of the clips 5 includes a body 50, a first fixing portion 55A, and a second fixing portion 55B. The body 50 is placed onto a bottom surface 213 of the groove 21 of the cushion member 2. The first fixing portion 55A is connected to one side (the positive Y-axis side) of the body 50 in the Y-axis direction and fixed in place in a state of being inserted in the first side wall surface 211 of the groove 21. The second fixing portion 55B is connected to the other side (the negative Y-axis side) of the body 50 in the Y-axis direction and fixed in place in a state of being inserted in the second side wall surface 212 of the groove 21.

The body 50 has a plate-like shape having a recess that is formed to be recessed toward the negative Z-axis side and that extends in the X-axis direction, and the body 50 is arranged on the bottom surface 213 of the groove 21 of the cushion member 2 in such a manner as to be in contact with the bottom surface 213. Specifically, the body 50 includes the first guide 51 and the second guide 52 that are arranged with a gap G formed therebetween in the Y-axis direction and includes a connecting portion 53 that connects the first guide 51 and the second guide 52 to each other.

Figure 3:
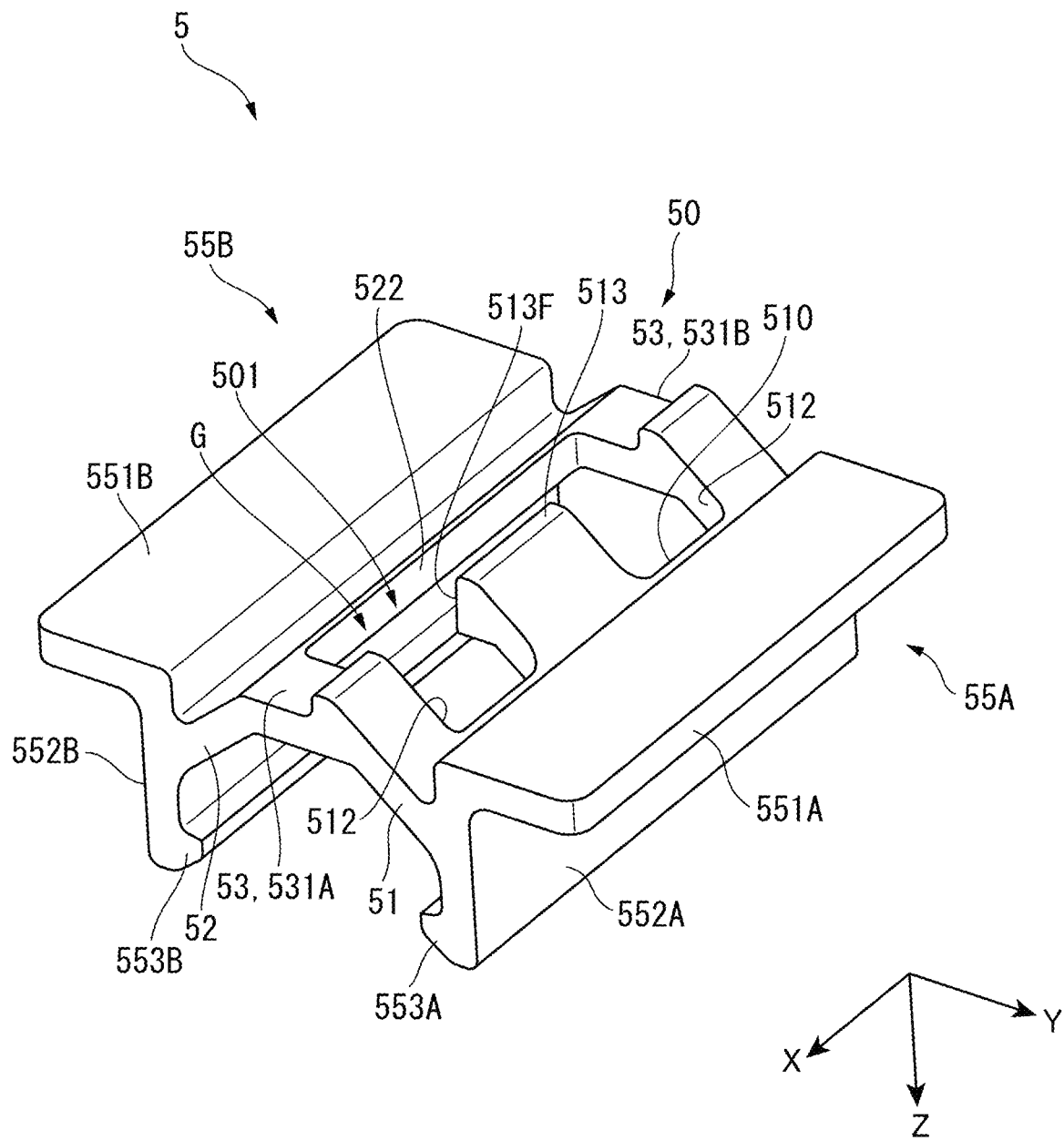
FIG. 3 is a perspective view illustrating a clip of the first exemplary embodiment.

As illustrated in, for example, FIG. 3, the first guide 51 includes a base 510 that is connected to the first fixing portion 55A and a tongue 513 that projects from the base 510 toward the gap G. In other words, the first guide 51 has a pair of slits 512 that are formed at different positions in the X-axis direction. A portion of the first guide 51 between the pair of slits 512 forms the tongue 513, and the remaining portion of the first guide 51 forms the base 510.

In addition, the first guide 51 has a guide surface 511 extending from the base 510 to a portion of the tongue 513. This guide surface 511 is inclined with respect to the Z-axis direction and the Y-axis direction in such a manner as to face the positive Z-axis side and the negative Y-axis side.

The tongue 513 is elastically deformable in the Z-axis direction by being pressed in the Z-axis direction. The tongue 513 has an end surface 513F facing the gap G in the Y-axis direction. The end surface 513F faces an edge portion 522 on the gap G side of the second guide 52. Note that it is preferable that a dimension T1 of the end surface 513F in the Z-axis direction be larger toward the negative Z-axis side than a dimension T2 of the edge portion 522 of the second guide 52 in the Z-axis direction.

As illustrated in, for example, FIG. 2, the second guide 52 has a plate-like shape and is connected to the second fixing portion 55B. The second guide 52 includes the edge portion 522 facing the gap G in the Y-axis direction, and the edge portion 522 faces the end surface 513F of the tongue 513 with the gap G interposed therebetween.

The second guide 52 has a guide surface 521 that is inclined with respect to the Z-axis direction and the Y-axis direction in such a manner as to face the positive Z-axis side and the positive Y-axis side.

Here, the guide surface 511 of the first guide 51 and the guide surface 521 of the second guide 52 face each other in the Y-axis direction and form a tapered shape such that they come closer to each other toward the negative Z-axis side. The guide surface 511 and the guide surface 521 can guide the suspender 4 that comes close to the clip 5 into the gap G.

When the first guide 51 and the second guide 52 are placed on the bottom surface 213 of the groove 21, the bottom surface 213 of the groove 21 is exposed through the gap G between the first guide 51 and the second guide 52.

To be precise, the gap G between the first guide 51 and the second guide 52 extends along a region in which the first guide 51 and the second guide 52 face each other including a region in which the guide surfaces 511 and 521 face each other. However, the gap G of the first exemplary embodiment is defined as a gap formed between an inner end portion of the first guide 51 in the Y-axis direction and an inner end portion of the second guide 52 in the Y-axis direction and extending through the clip in the vertical direction.

The connecting portion 53 includes a pair of bridges 531A and 531B extending across the gap G between the first guide 51 and the second guide 52. Specifically, the pair of bridges 531A and 531B is arranged with a space formed therebetween in the X-axis direction and connects the base 510 of the first guide 51 to the second guide 52.

Figure 4:
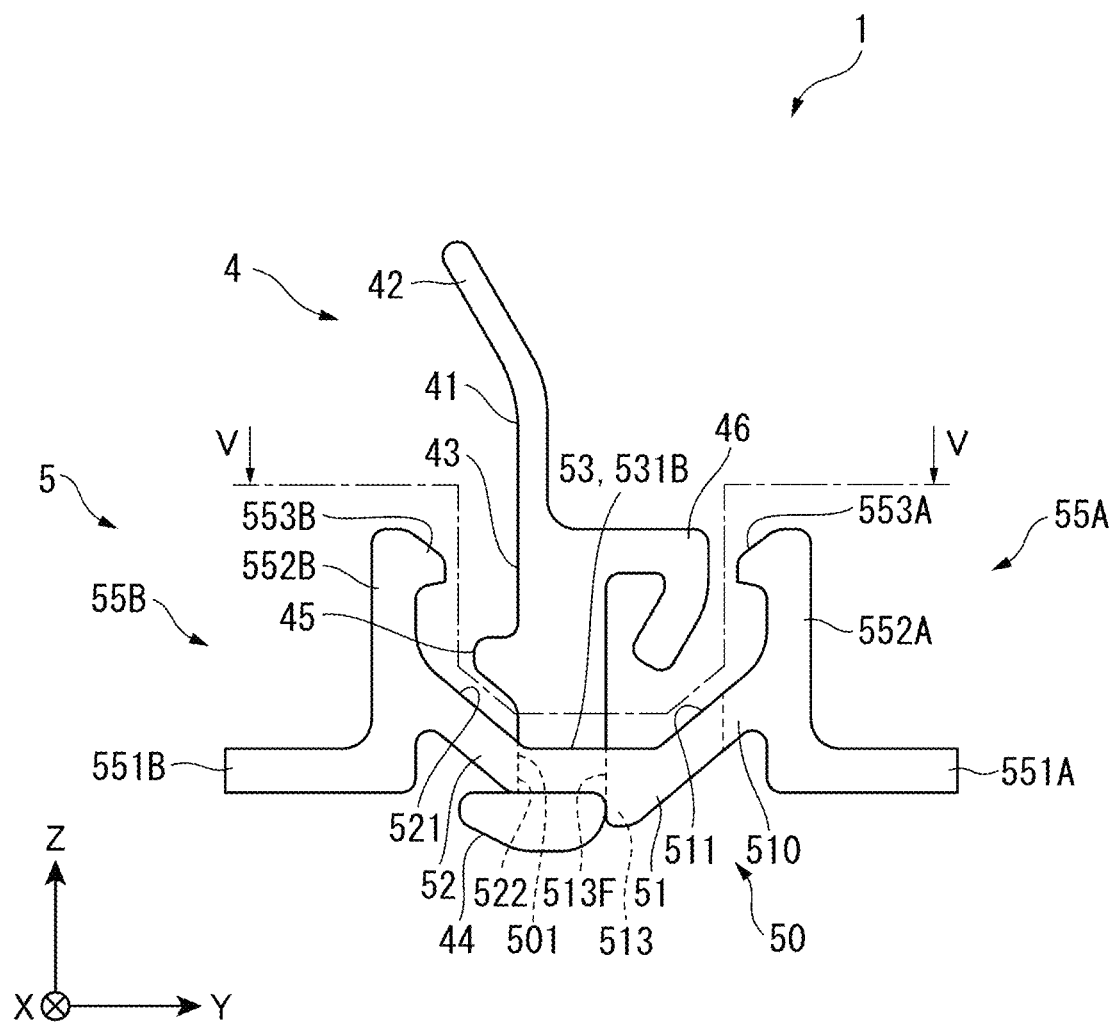
FIG. 4 is a side view illustrating the cover-member attachment tool of the first exemplary embodiment.

Note that, in the first exemplary embodiment, as illustrated in, for example, FIG. 4, the first guide 51, the second guide 52, and the pair of bridges 531A and 531B define a through hole 501 extending through the body 50 in the Z-axis direction. In other words, the gap G between the first guide 51 and the second guide 52 and the pair of slits 512 of the first guide 51 together define the through hole 501.

As illustrated in, for example, FIG. 1, the first fixing portion 55A includes a first base 551A, a first leg 552A extending toward the positive Z-axis side from the first base 551A, and a first claw 553A projecting toward the negative Y-axis side from an end of the first leg 552A. Here, the first guide 51 extends toward the negative Y-axis side from an intermediate portion of the first leg 552A.

The second fixing portion 55B includes a second base 551B, a second leg 552B extending toward the positive Z-axis side from the second base 551B, and a second claw 553B projecting toward the positive Y-axis side from an end of the second leg 552B. Here, the second guide 52 extends toward the positive Y-axis side from an intermediate portion of the second leg 552B.

The first fixing portion 55A and the second fixing portion 55B are each substantially embedded in the cushion member 2, and the first fixing portion 55A and the second fixing portion 55B each have a function of fixing the clip 5 to the cushion member 2. Specifically, in the first fixing portion 55A, the first base 551A, the positive Y-axis side of the first leg 552A, and the positive Z-axis side of the first claw 553A are covered with the cushion member 2. Similarly, in the second fixing portion 55B, the second base 551B, the negative Y-axis side of the second leg 552B, and the positive Z-axis side of the second claw 553B are covered with the cushion member 2.

Figure 5:
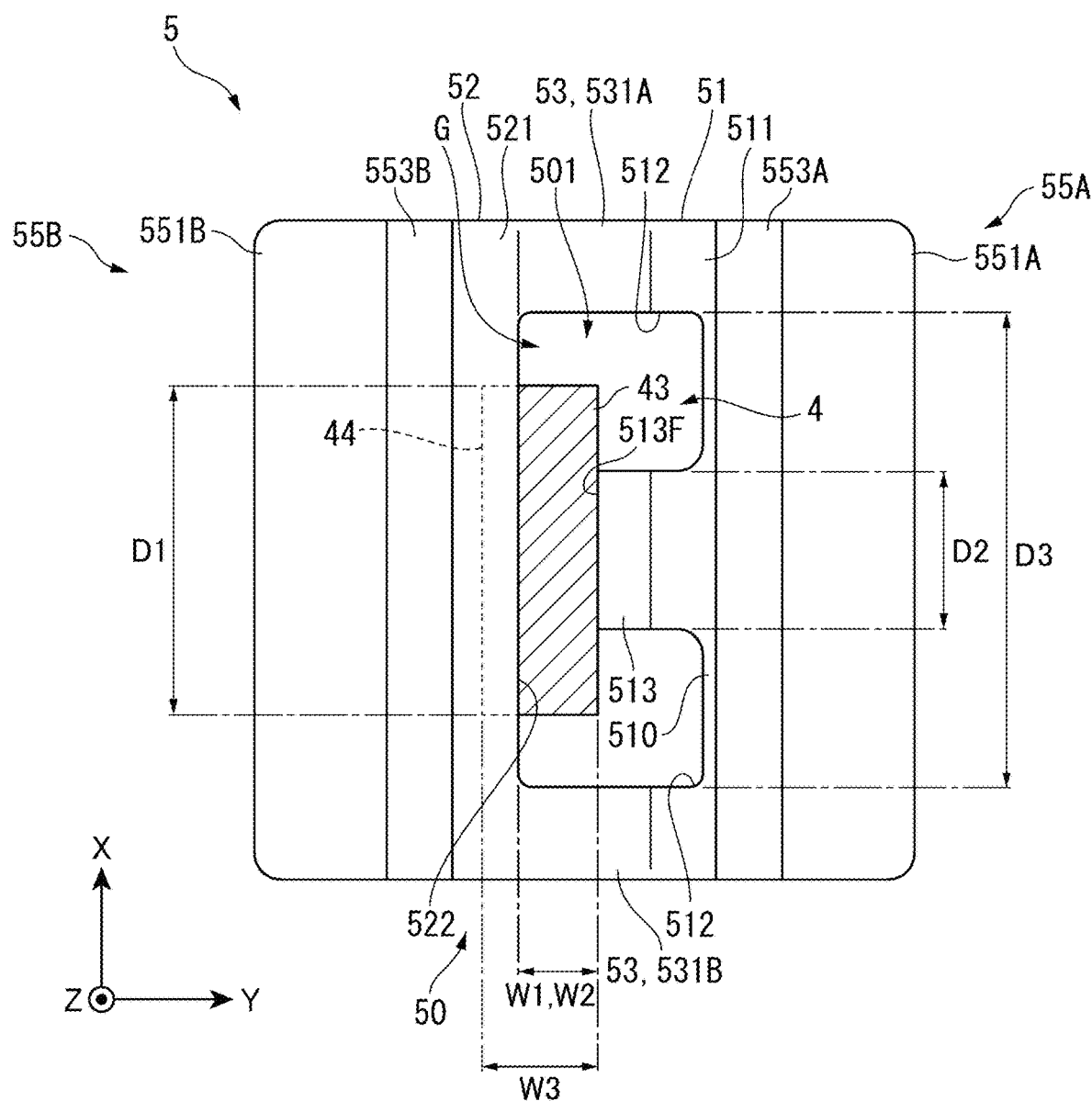
FIG. 5 is a cross-sectional view taken along line V-V of FIG. 4.

In the cover-member attachment tool 1, which has been described above, the body 43 of the suspender 4 is insertable through the gap G of the clip 5 (i.e., configured to penetrate through the through hole 501). Specifically, as illustrated in FIG. 5, it is preferable that a dimension W1 of the body 43 in the Y-axis direction be equal to a minimum dimension W2 of the gap G of the clip 5 in the Y-axis direction (particularly, the dimension W2 in the Y-axis direction of the gap G between the tongue 513 and the second guide 52). It is preferable that a dimension D1 of each of the bodies 43 in the X-axis direction be larger than a dimension D2 of the tongue 513 in the X-axis direction and be smaller than a dimension D3 of the through hole 501 in the X-axis direction.

In addition, in the cover-member attachment tool 1, the suspender 4 is configured such that the engagement portion 44 is engageable with the second guide 52 in a state where the body 43 is inserted through the through hole 501 of the clip 5. Specifically, it is preferable that a maximum dimension W3 of the body 43 and the engagement portion 44 in the Y-axis direction be larger than the minimum dimension W2 of the gap G of the clip 5 in the Y-axis direction.

Installation of Clip 5

Figure 6:
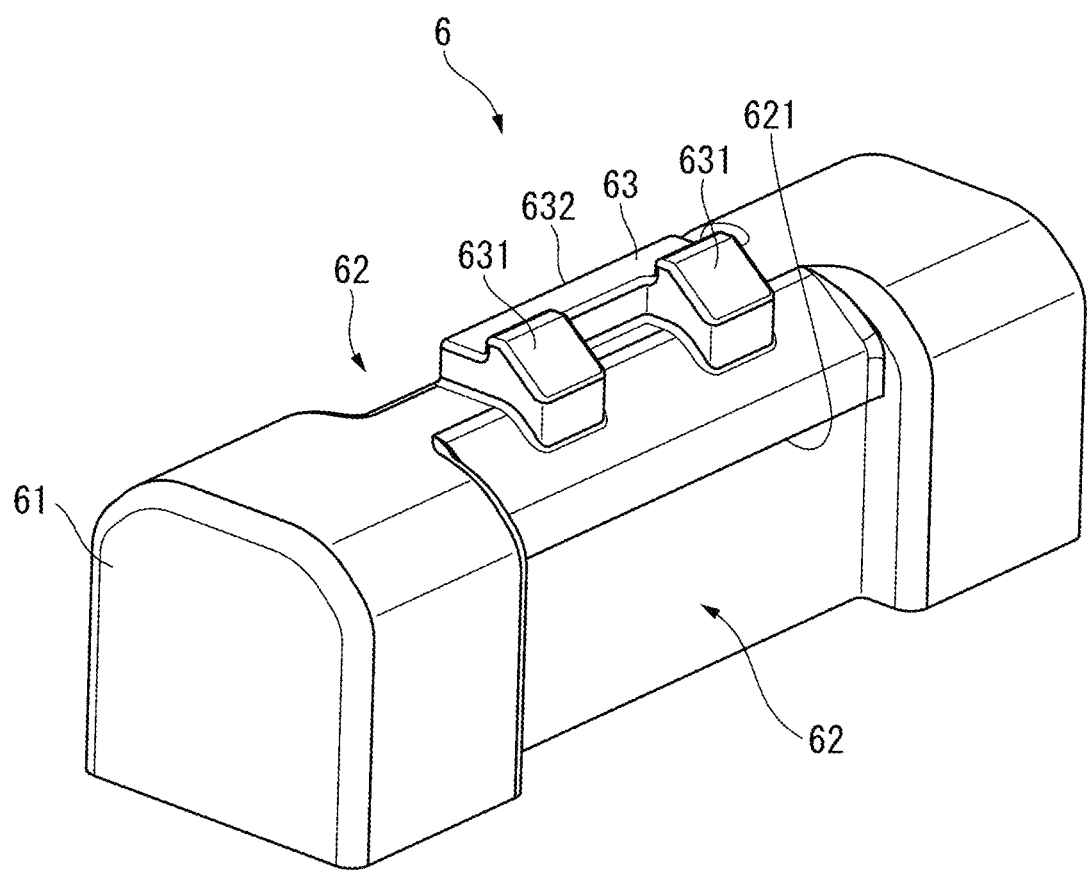
FIG. 6 is a perspective view illustrating a trench onto which the clip of the first exemplary embodiment is mounted when the cushion member is formed.
Figure 7:
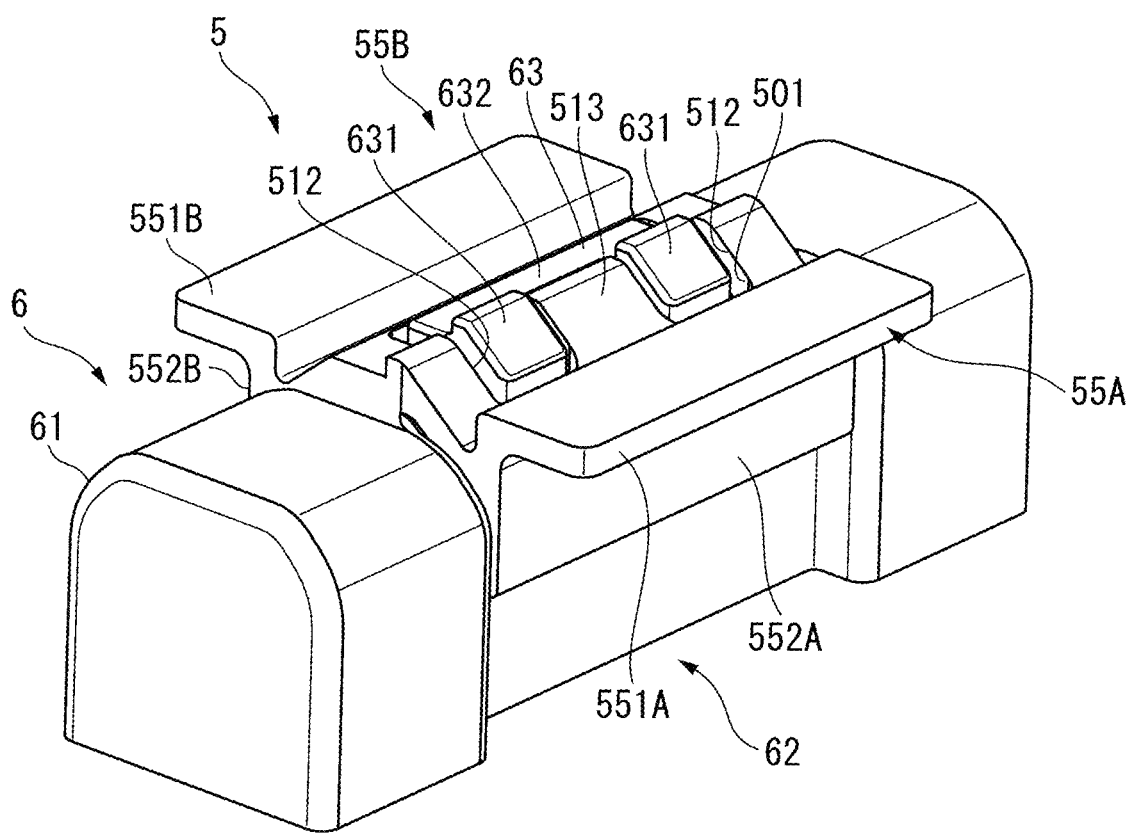
FIG. 7 is a perspective view illustrating a state where the clip of the first exemplary embodiment is mounted on the trench.
Figure 8:
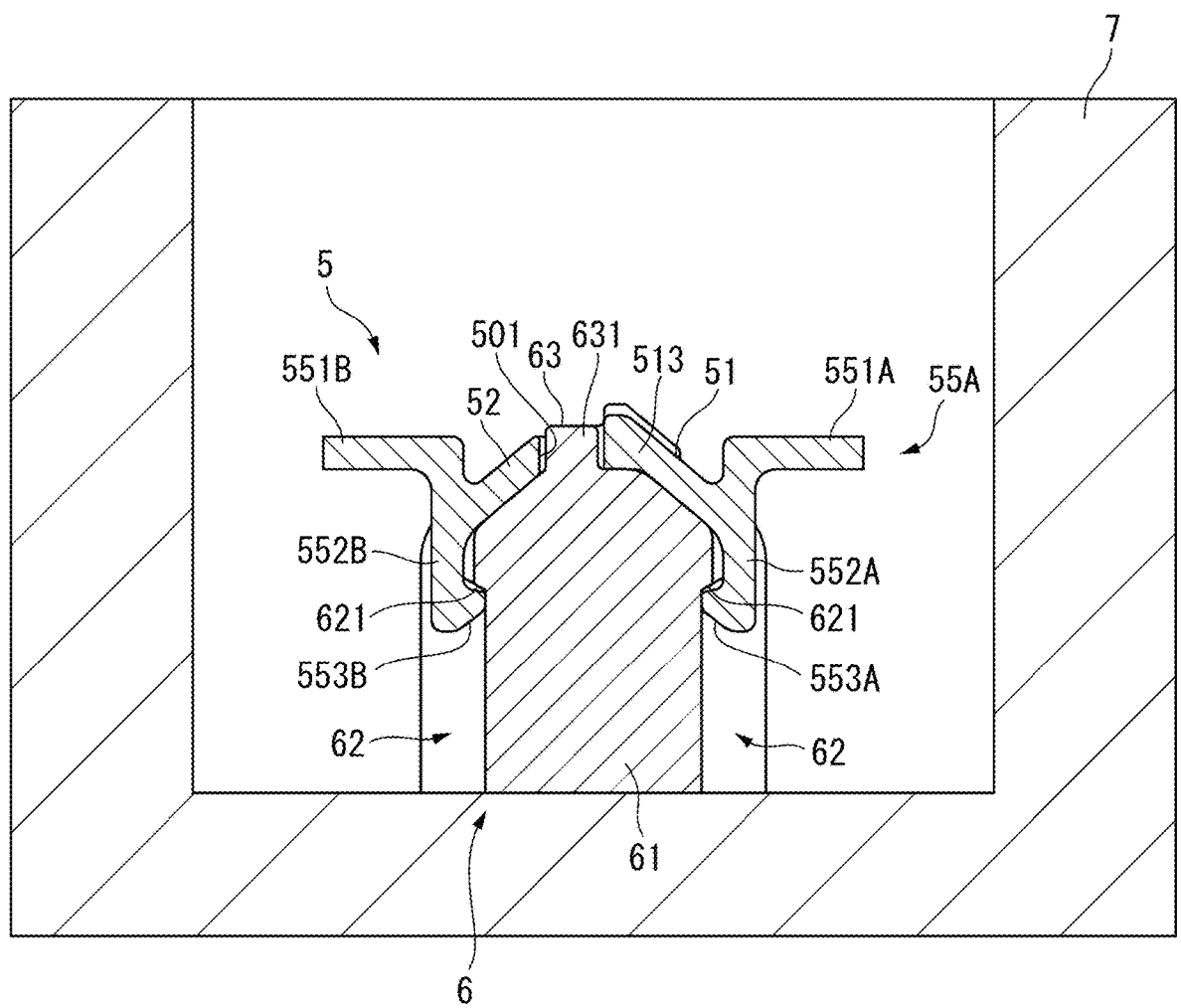
FIG. 8 is a cross-sectional view schematically illustrating a state where the clip of the first exemplary embodiment is mounted on the trench disposed in a metal mold.

An example of a method of installing the clips 5 of the first exemplary embodiment into the cushion member 2 will now be briefly described with reference to FIG. 6 to FIG. 8. Note that, for simplification of the drawings, FIG. 6 and FIG. 7 illustrate portions of one of trenches 6 that are arranged in a mold 7 of the cushion member 2, the trench 6 corresponding to one of the clips 5. FIG. 8 schematically illustrates the cross section of the mold 7 of the cushion member 2 and the cross section of the trench 6.

First, the trench 6 which is illustrated in FIG. 6 is prepared. Here, the trench 6 is a mold for forming the groove 21 of the cushion member 2 and is arranged at a position corresponding to the groove 21. The trench 6 includes a body 61, a pair of recesses 62 formed in the body 61, and a projection 63 projecting in the depth direction of the groove 21 between the pair of recesses 62.

Note that a step portion 621 is formed in each of the pair of recesses 62, and the step portion 621 extends in the length direction of the groove 21 and forms a step in the depth direction of the groove 21. The projection 63 has a shape corresponding to the shape of the through hole 501 of the clip 5. Specifically, the projection 63 includes a pair of first projecting portions 631 that corresponds to the pair of slits 512 of the clip 5 and a second projecting portion 632 that corresponds to a region defining the through hole 501 of the clip 5 and excluding the pair of slits 512.

Next, the clip 5 is mounted onto the trench 6 arranged in the mold 7 of the cushion member 2. In this case, as illustrated in FIG. 7 and FIG. 8, the first leg 552A and the second leg 552B of the clip 5 are fitted into the pair of recesses 62 of the trench 6, and the first claw 553A and the second claw 553B of the clip 5 engage with the step portions 621, which are formed in the pair of recesses 62, while holding the body 61 of the trench 6. As a result, the clip 5 is held by the trench 6.

In addition, when the clip 5 is mounted, the projection 63 of the trench 6 is inserted through the through hole 501 of the clip 5. Here, the projection 63 of the trench 6 blocks the through hole 501 of the clip 5 while being inserted through the through hole 501.

Next, a material of the cushion member 2 is injected into the mold 7 of the cushion member 2, and then, the material is foamed and solidified, so that the cushion member 2 is formed. As a result, the first fixing portion 55A and the second fixing portion 55B of the clip 5 are each embedded in the cushion member 2 and fixed to the cushion member 2. Note that the projection 63 of the trench 6 is arranged in the through hole 501 of the clip 5, and thus, the material of the cushion member 2 will not enter the through hole 501.

After that, the trench 6 and the mold 7 are removed from the cushion member 2. In this case, a region in the mold 7 of the cushion member 2 where the trench 6 had been present becomes the groove 21, and the clip 5 is placed in the groove 21. In addition, the through hole 501 of the clip 5 in which the projection 63 of the trench 6 had been present becomes a space in which the cushion member 2 is not present.

Cover-Member Attachment Method

A cover-member attachment method using the cover-member attachment tool 1 of the first exemplary embodiment will now be described with reference to FIG. 1, FIG. 9, and FIG. 10. Note that, for simplification of the drawings, FIG. 9 and FIG. 10 do not illustrate the cover member 3, and a basic outline of the groove 21 of the cushion member 2 is indicated by a two-dot chain line.

First, an operator prepares the suspender 4 to which the cover member 3 has been attached and the cushion member 2 in which the clip 5 has been placed in the groove 21 and places the cover member 3 such that the cushion member 2 is covered with the cover member 3. Then, the suspender 4 is inserted into the groove 21 of the cushion member 2 by pressing means (the operator, an automatic machine, or the like), and pressure is applied to the pressing surface 431 of the suspender 4 in the negative-Z-axis direction.

Figure 9:
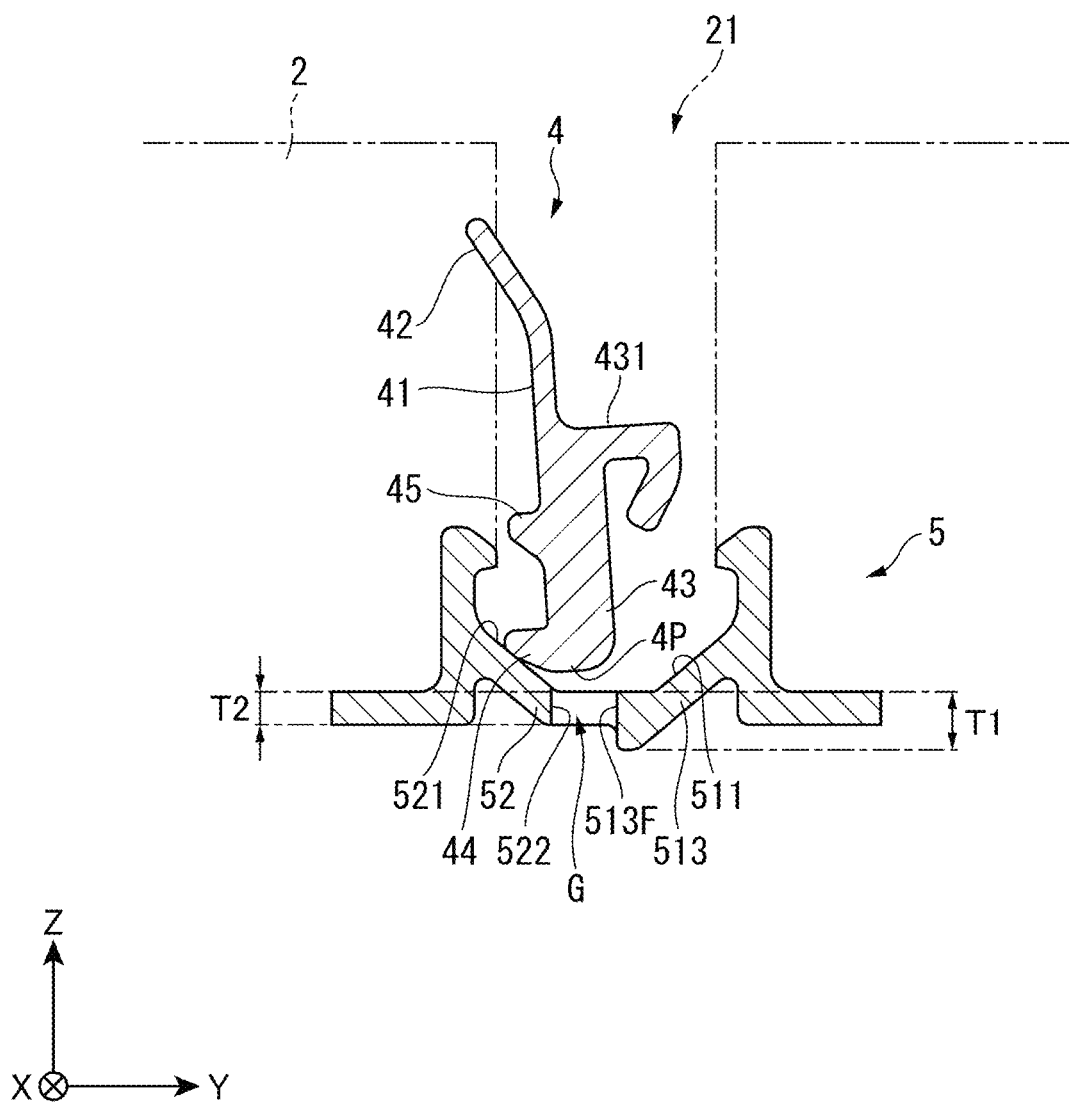
FIG. 9 is a diagram illustrating a cover-member attachment method using the cover-member attachment tool of the first exemplary embodiment and illustrating a state before a suspender is inserted into the clip.

When the suspender 4 is inserted into the groove 21, as illustrated in FIG. 9, the attitude of the suspender 4 may sometimes become inclined with respect to the Z-axis direction, or the suspender 4 may sometimes become offset from the center of the clip in the Y-axis direction. In such a case, an insertion end portion 4P of the suspender 4 (an end portion of the engagement portion 44 or the end portion of the body 43) abuts against the guide surface 511 or the guide surface 521 of the clip 5, so that the suspender 4 is guided toward the center of the clip 5 in the Y-axis direction, that is, guided into the gap G between the first guide 51 and the second guide 52.

Figure 10:
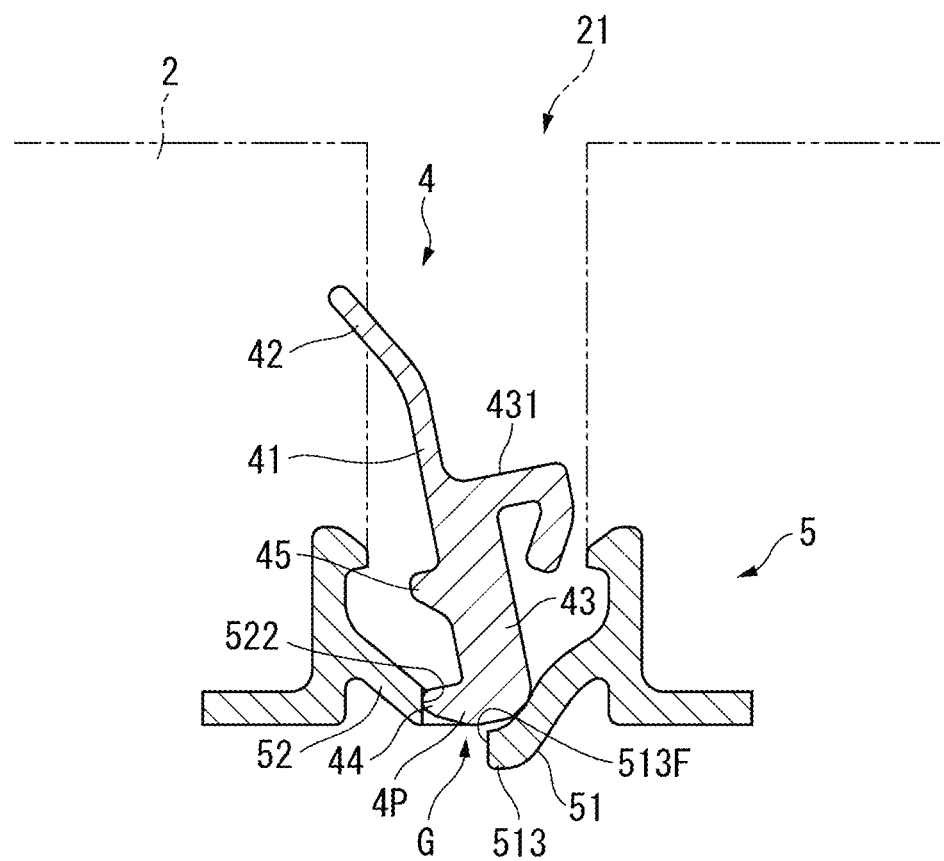
FIG. 10 is a diagram illustrating the cover-member attachment method using the cover-member attachment tool of the first exemplary embodiment and illustrating a state where the suspender is in the process of being inserted into the clip.

Subsequently, the pressing surface 431 of the suspender 4 is kept pressed, and then, as illustrated in FIG. 10, the insertion end portion 4P of the suspender 4 is inserted through the gap G while causing elastic deformation of the tongue 513 of the clip 5 in the negative-Z-axis direction. In this case, the cushion member 2 may be elastically deformed together with the tongue 513.

Once the engagement portion 44 of the suspender 4 has passed through the gap G, the tongue 513 of the clip 5 returns to its original shape. In this case, the end surface 513F of the tongue 513 presses the body 43 in the negative Y-axis direction. This moves the engagement portion 44 of the suspender 4 to be positioned on the negative Z-axis side with respect to the edge portion 522 of the second guide 52 while causing elastic deformation of the cushion member 2. As a result, the engagement portion 44 engages with the second guide 52 in the Z-axis direction. When the engagement portion 44 passes through the gap G of the clip 5, the clip 5 provides tactile feedback as a result of the tongue 513 being pressed.

In the manner described above, the suspender 4 and the clip 5 are engaged with each other as illustrated in FIG. 1. Therefore, the cover member 3 can be attached to the cushion member 2.

Note that, when pressing means presses the suspender 4, the projection 45 of the suspender 4 may be brought into contact with the second guide 52 from the positive Z-axis side. This can prevent the suspender 4 from being excessively inserted into the clip 5.

In addition, although a case has been described in which the engagement portion 44 of the suspender 4 engages with the second guide 52, in the case where the suspender 4 is arranged by being reversed in the Y-axis direction, the engagement portion 44 of the suspender 4 may engage with the tongue 513 of the first guide 51.

Detachment Method

In the cover-member attachment tool 1 of the first exemplary embodiment, the suspender 4 can be detached from the clip 5 by using a jig. For example, the jig is hooked onto the jig hook 46 of the suspender 4, and the suspender 4 is tilted toward the negative Y-axis side. This enables the engagement portion 44 to pass through the gap G, so that the suspender 4 can be pulled out of the clip 5.

Advantageous Effects of First Exemplary Embodiment

In the first exemplary embodiment, as described above, the first guide 51 and the second guide 52 of the clip 5 are each placed on the bottom surface 213 of the groove 21 of the cushion member 2, and the engagement portion 44 of the suspender 4 inserted through the gap G between the first guide 51 and the second guide 52 engages with the second guide 52.

With such a configuration, there is no need to form an accommodation space for the suspender 4 inside the clip 5, and an increase in the dimension of the clip 5 in the depth direction of the groove 21 of the cushion member 2 (the Z-axis direction) can be suppressed. Thus, even in the case where the groove 21 of the cushion member 2 is shallow, the clip 5 or the suspender 4 engaged with the clip 5 can be disposed at a position sufficiently spaced apart from the opening of the groove 21. As a result, the likelihood that a user will feel the clip 5 or the suspender 4 in the cushion member 2 can be reduced.

In addition, in the first exemplary embodiment, since the clip 5 or the suspender 4 engaged with the clip 5 can be disposed at a position sufficiently spaced apart from the opening of the groove 21, the appearance of the cushion member 2 to which the cover member 3 has been attached can be improved.

In the first exemplary embodiment, the bottom surface 213 of the groove 21 of the cushion member 2 is exposed through the gap G between the first guide 51 and the second guide 52.

With such a configuration, an increase in the dimension of the clip 5 in the depth direction of the groove 21 of the cushion member 2 (the Z-axis direction) can be appropriately suppressed.

The first guide 51 of the first exemplary embodiment includes the tongue 513, which is elastically deformable toward the bottom surface 213 of the groove 21 of the cushion member 2 (the negative Z-axis side), and the tongue 513 has the end surface 513F facing the edge portion 522 of the second guide 52 with the gap G interposed therebetween.

With such a configuration, when the engagement portion 44 of the suspender 4 is inserted through the gap G between the first guide 51 and the second guide 52, the tongue 513 is elastically deformed by being pressed by the suspender 4, so that the gap G expands, and thus, the engagement portion 44 may be easily inserted through the gap G. In addition, after the engagement portion 44 has passed through the gap G, the tongue 513 returns to its original shape and presses the suspender 4 toward the second guide 52, and thus, the engagement portion 44 and the second guide 52 may be easily engaged with each other. Furthermore, the clip 5 provides tactile feedback, so that the sensation of inserting the suspenders 4 therein can be improved.

In the first exemplary embodiment, the dimension T1 of the end surface 513F of the tongue 513 in the Z-axis direction is larger than the dimension T2 of the edge portion 522 of the second guide 52 in the Z-axis direction.

With such a configuration, after the engagement portion 44 of the suspender 4 has passed through the gap G between the first guide 51 and the second guide 52, the end surface 513F of the tongue 513 can appropriately apply pressure to the suspender 4 toward the second guide 52.

The connecting portion 53 of the first exemplary embodiment includes the pair of bridges 531A and 531B extending across the gap G between the first guide 51 and the second guide 52, and the first guide 51, the second guide 52, and the pair of bridges 531A and 531B define the through hole 501 extending through the clip 5 in the Z-axis direction.

With such a configuration, since the gap G between the first guide 51 and the second guide 52 is formed as the through hole 501, an unintentional expansion of the gap G can be suppressed, and the state of the suspender 4 being engaged with the clip can be appropriately maintained.

The clip 5 of the first exemplary embodiment includes the first leg 552A that is connected to the first guide 51 and that extends toward the side on which the groove 21 of the cushion member 2 is open, the second leg 552B that is connected to the second guide 52 and that extends toward the side on which the groove 21 of the cushion member 2 is open, the first claw 553A projecting from the end of the first leg 552A toward the second leg 552B, and the second claw 553B projecting from the end of the second leg 552B toward the first leg 552A.

With such a configuration, when the cushion member 2 is formed, the first claw 553A and the second claw 553B can hold the trench 6, which corresponds to the groove 21. As a result, mounting of the clip 5 onto the trench 6 can be easily performed. In other words, the clip 5 can be easily installed in the cushion member 2.

The cover-member attachment tool 1 of the first exemplary embodiment includes the above-described clip 5 and the above-described suspender 4, which are configured to be attached to the cover member 3, and the suspender 4 includes the body 43 that is insertable through the gap G between the first guide 51 and the second guide 52 and the engagement portion 44 that projects from the body 43 toward one side in the width direction of the groove 21 and that is engageable with the second guide 52. The engagement portion 44 is inserted between the second guide 52 and the bottom surface 213 of the groove 21.

With such a configuration, as mentioned above, the likelihood that a user will feel the clip 5 or the suspender 4 in the cushion member 2 can be reduced.

In addition, by operation of tilting the suspender 4 and pulling it out of the clip 5, engagement of the engagement portion 44 with the second guide 52 can be released. This facilitates repair of the cover member 3.

In the first exemplary embodiment, the suspender 4 further includes the projection 45 that projects from the body 43 and that can be brought into contact with the clip 5 from the side on which the groove 21 is open.

With such a configuration, the suspender 4 can be prevented from being excessively inserted into the clip 5, so that breakage of the cushion member 2 can be suppressed.

Second Exemplary Embodiment

A second exemplary embodiment of the invention will be described with reference to FIG. 11. Note that, in the second exemplary embodiment, components similar to those in the first exemplary embodiment are denoted by similar reference signs, and the descriptions thereof will be omitted or simplified.

Figure 11:
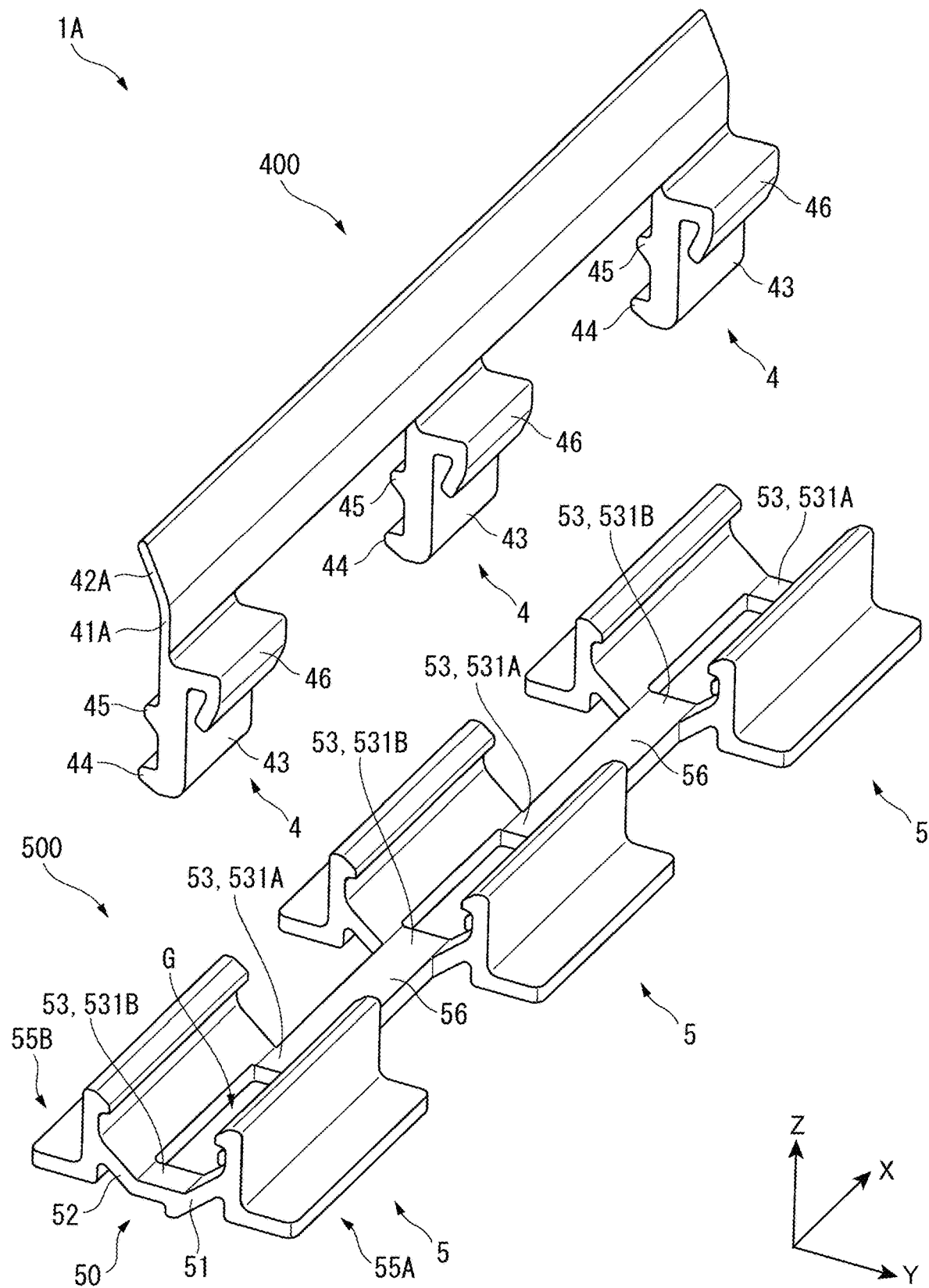
FIG. 11 is an exploded perspective view illustrating a cover-member attachment tool according to a second exemplary embodiment of the invention.

As illustrated in FIG. 11, a cover-member attachment tool 1A according to the second exemplary embodiment includes a suspender assembly 400 in which the plurality of suspenders 4 are integrated and a clip assembly 500 in which the plurality of clips 5 are integrated.

The suspender assembly 400 includes the plurality of suspenders 4 arranged along the X-axis direction. In the second exemplary embodiment, the attachment portions 41 of the suspenders 4, which have been described in the first exemplary embodiment, are integrated to form an attachment portion 41A extending between the plurality of suspenders 4, and the inclined portions 42 of the suspenders 4, which have been described in the first exemplary embodiment, are integrated to form an inclined portion 42A extending between the plurality of suspenders 4. In other words, the suspender assembly 400 includes the attachment portion 41A and the inclined portion 42A that are each continuously formed along the X-axis direction, a plurality of bodies 43 that are connected to the attachment portion 41A, engagement portions 44, projections 45 and jig hooks 46 that are provided to the corresponding bodies 43.

The clip assembly 500 includes the plurality of clips 5 arranged along the X-axis direction and clip connecting portions 56 each of which connects adjacent ones of the clips 5. Each of the clip connecting portions 56 has a bar-like shape and connects the connecting portions 53 of the adjacent clips 5 to each other, that is, connects the bridge 531A of one of the clips 5 to the bridge 531B of its adjacent clip 5.

In the second exemplary embodiment, which has been described above, the attachment portions 41 and the inclined portions 42 of the suspenders 4 and the clip connecting portions 56 of the clip assembly 500 have flexibility in an XY plane. Thus, the cover-member attachment tool 1A can be appropriately placed in the groove 21 that has a curved shape.

Note that the suspender assembly 400 and the clip assembly 500 of the second exemplary embodiment can each be manufactured by, for example, performing intermittent cutting after extrusion molding.

A cover-member attachment method in the second exemplary embodiment is substantially similar to the cover-member attachment method of the first exemplary embodiment, which has been described above. For example, the suspender assembly 400 is inserted into the groove 21 of the cushion member 2, and pressure is applied to each of the suspenders 4 in the negative-Z-axis direction, so that each of the suspenders 4 can be engaged with the corresponding clip 5.

The second exemplary embodiment, which has been described above, can obtain advantageous effects similar to those of the first exemplary embodiment.

Third Exemplary Embodiment

Figure 12:
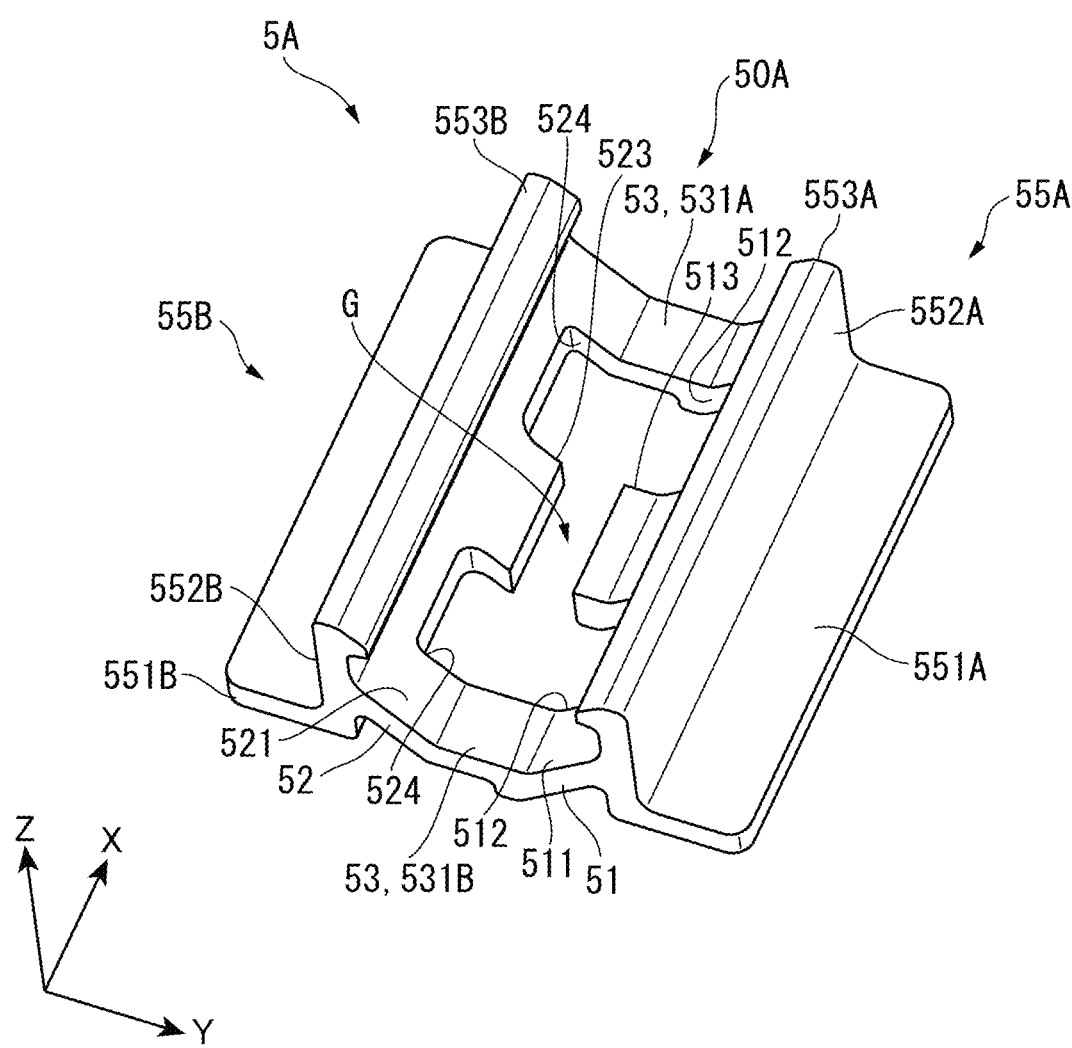
FIG. 12 is a perspective view illustrating a clip of a cover-member attachment tool according to a third exemplary embodiment of the invention.
Figure 13:
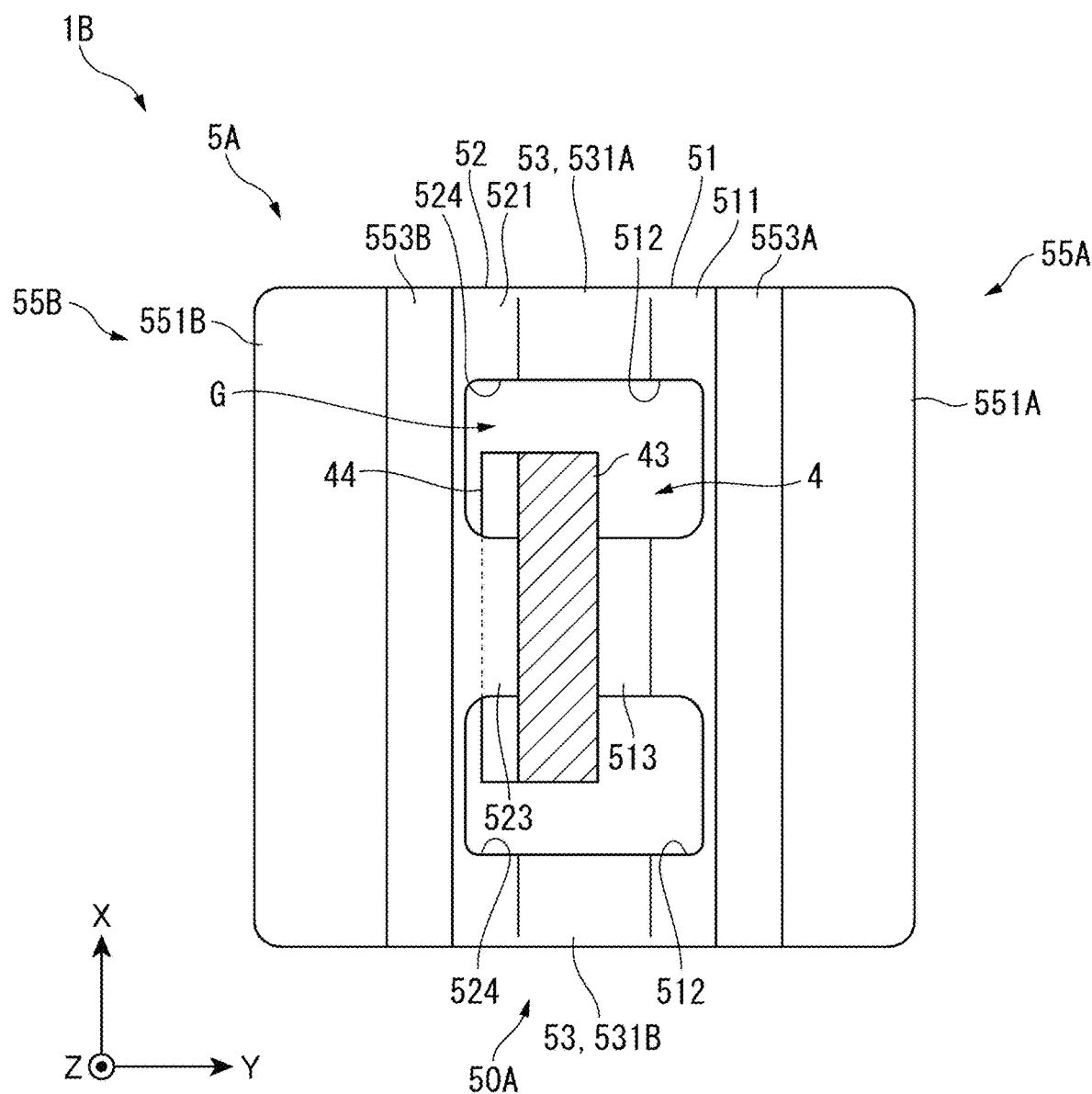
FIG. 13 is a diagram illustrating the cover-member attachment tool of the third exemplary embodiment and a cross-sectional view corresponding to FIG. 5.

A third exemplary embodiment of the invention will be described with reference to FIG. 12 and FIG. 13. Note that, in the third exemplary embodiment, components similar to those in the first exemplary embodiment are denoted by similar reference signs, and the descriptions thereof will be omitted or simplified.

A cover-member attachment tool 1B according to the third exemplary embodiment includes the suspender 4 similar to that of the first exemplary embodiment and a clip 5A that is different from the clip 5 of the first exemplary embodiment.

Substantially similar to the clip 5 of the first exemplary embodiment, the clip 5A of the third exemplary embodiment includes a body 50A, a first fixing portion 55A, and a second fixing portion 55B.

Here, in the body 50A, not only the pair of slits 512 is formed in the first guide 51 but also a pair of slits 524 is formed in the second guide 52. The pair of slits 524 each has a shape formed by cutting the second guide 52 from the gap G toward the negative Y-axis side and are arranged with a space formed therebetween in the X-axis direction. As a result, the second guide 52 includes a portion located between the pair of slits 524, the portion serving as a tongue 523 that is elastically deformable in the Z-axis direction.

In other words, in the clip 5A of the third exemplary embodiment, the first guide 51 includes the tongue 513, and the second guide 52 includes the tongue 523.

A cover-member attachment method in the third exemplary embodiment is substantially similar to the cover-member attachment method of the first exemplary embodiment, which has been described above.

For example, the suspender 4 is inserted into the groove 21 of the cushion member 2, and pressure is applied to the suspender 4 in the negative-Z-axis direction. In this case, the suspender 4 can be inserted through the gap G while causing elastic deformation of both the tongues 513 and 523 (or one of the tongues 513 and 523) of the clip 5A in the negative-Z-axis direction. In addition, once the engagement portion 44 of the suspender 4 has passed through the gap G, the engagement portion 44 of the suspender 4 is moved to be positioned on the negative Z-axis side with respect to the second guide 52 and engages with the tongue 523 of the second guide 52 in the Z-axis direction. As a result, the suspender 4 is engaged with the clip 5A.

Note that, also in the third exemplary embodiment, when the suspender 4 is arranged by being reversed in the Y-axis direction, the engagement portion 44 of the suspender 4 may engage with the tongue 513 of the first guide 51 as in the first exemplary embodiment.

The third exemplary embodiment, which has been described above, can obtain advantageous effects similar to those of the first exemplary embodiment. In addition, according to the clip 5A of the third exemplary embodiment, the suspender 4 may easily pass through the gap G between the tongues 513 and 523.

Modifications

Various modifications can be made to the above-described exemplary embodiments, and modifications, which will be described below, are applicable to any of the above-described exemplary embodiments.

Figure 14:
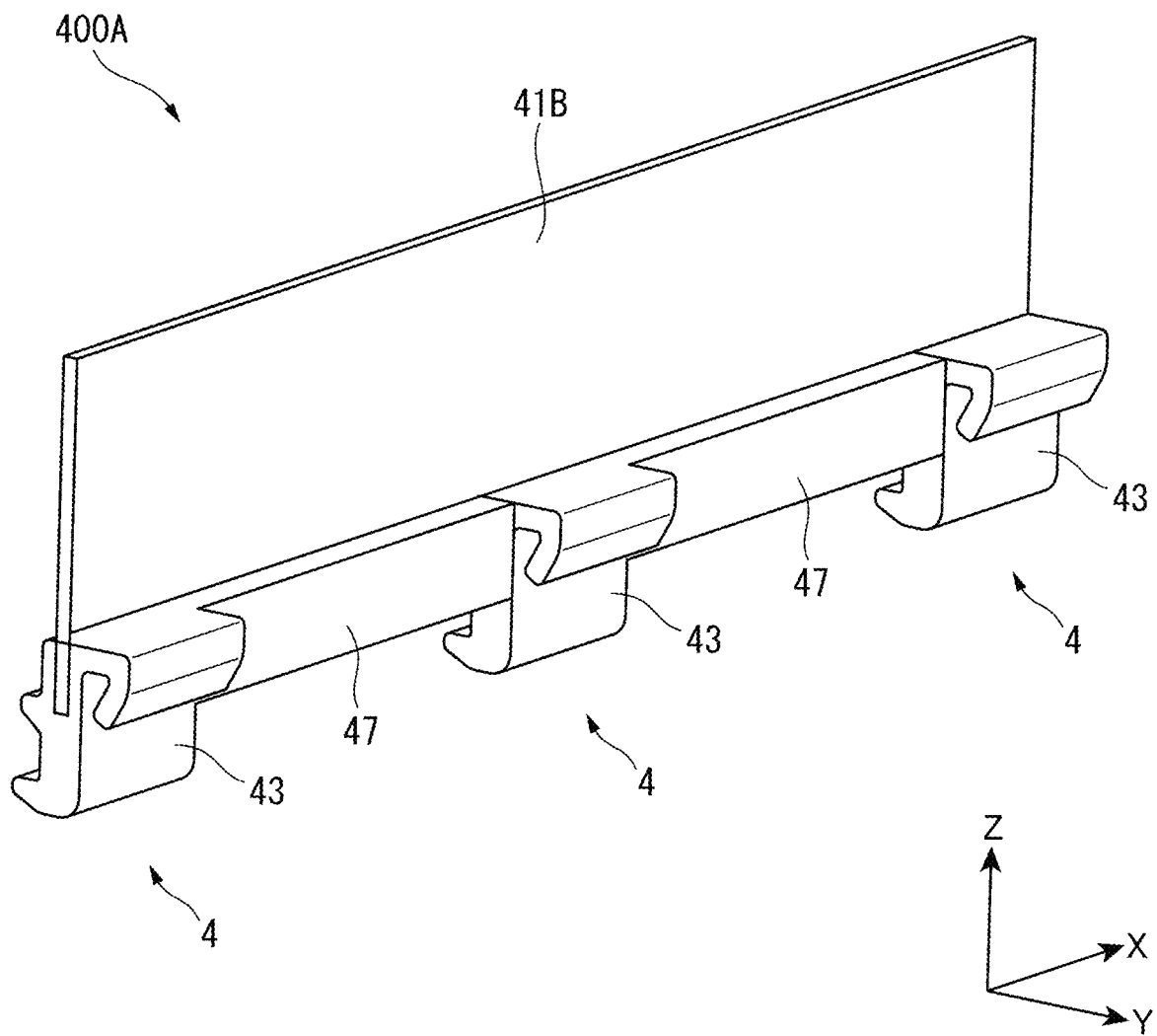
FIG. 14 is a perspective view illustrating a suspender according to a modification of the third exemplary embodiment.

For example, FIG. 14 is a diagram illustrating a suspender assembly 400A according to a modification of the second exemplary embodiment. In the modification illustrated in FIG. 14, the suspender assembly 400A includes, instead of the attachment portion 41A and the inclined portion 42A, an attachment portion 41B that is made of, for example, nonwoven fabric. In addition, in the modification illustrated in FIG. 14, the suspender assembly 400A further includes intermediate portions 47 each of which is disposed between adjacent ones of the bodies 43, the intermediate portions 47 being formed integrally with the bodies 43. Here, the attachment portion 41B, the bodies 43, and the intermediate portions 47 are integrally molded by insert molding, and the attachment portion 41B is attached to the cover member 3 by sewing or the like.

Figure 15:
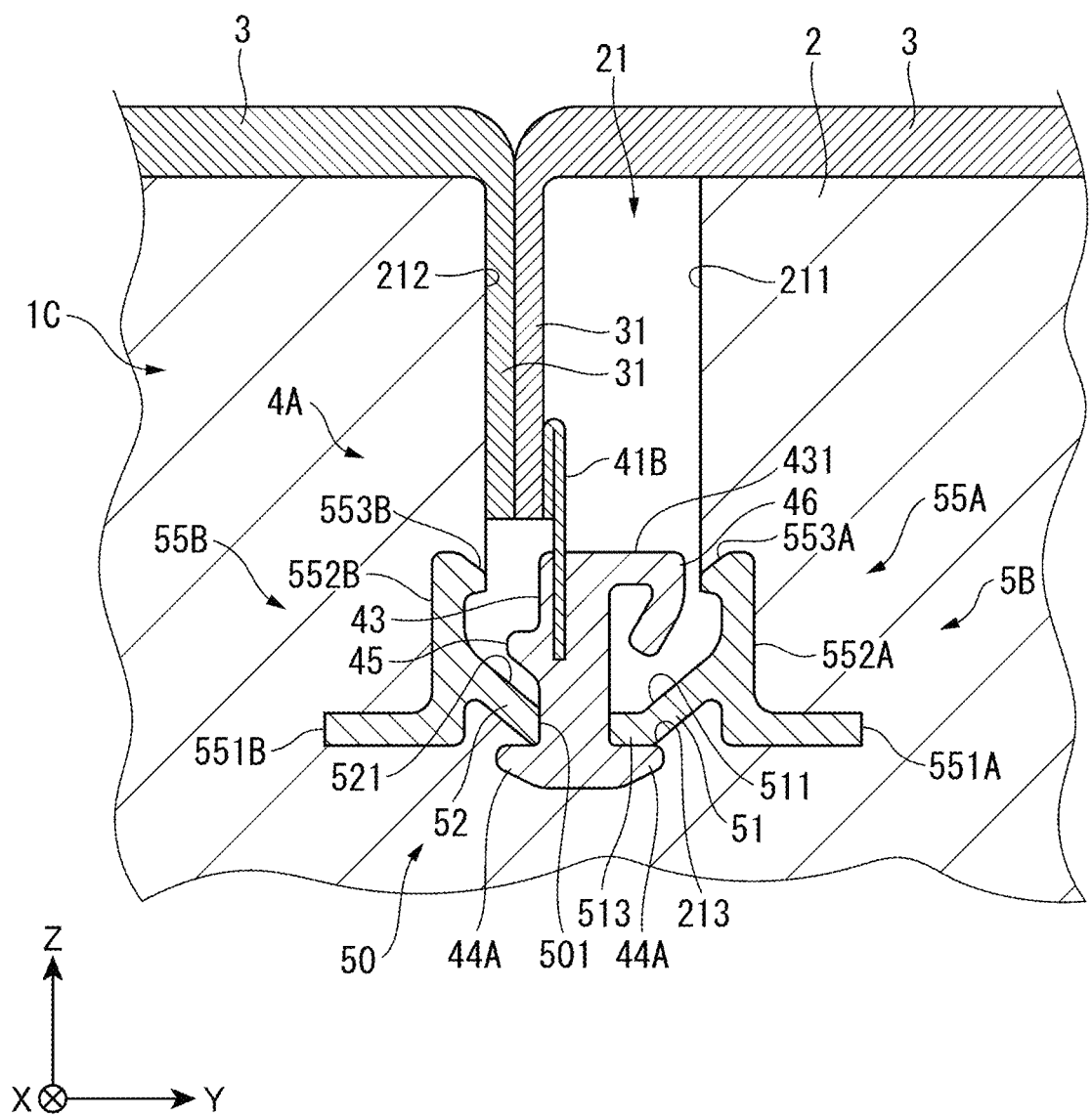
FIG. 15 is a diagram illustrating a cover-member attachment tool according to a modification of the first exemplary embodiment and a cross-sectional view illustrating a state where the cover-member attachment tool is installed in the cushion member.

FIG. 15 is a diagram illustrating a cover-member attachment tool 1C according to a modification of the first exemplary embodiment. In the modification illustrated in FIG. 15, a suspender 4A includes a pair of engagement portions 44A projecting from the body 43 toward the opposite sides in the Y-axis direction. In addition, in the clip 5B, a dimension of the first guide 51 in the Z-axis direction and a dimension of the second guide 52 in the Z-axis direction are set to be approximately equal to each other. In such a configuration, the pair of engagement portions 44A is engageable with the tongue 513 of the first guide 51 and the edge portion 522 of the second guide 52. In this case, the suspender 4A is not necessarily intended to be detached from the clip 5B.

In addition, in the modification illustrated in FIG. 15, the suspender 4A includes, instead of the attachment portion 41 and the inclined portion 42 that are integrally formed with the body 43, the attachment portion 41B that is made of, for example, nonwoven fabric and that is formed with the body 43 by insert molding, and the attachment portion 41B includes a folded portion that is formed by being folded toward the negative Y-axis side. The cover member 3 is sewn to the folded portion of the attachment portion 41B on the negative Y-axis side. As a result, the wide pressing surface 431 of the suspender 4A is ensured.

In each of the above-described exemplary embodiments, the first guide 51 and the second guide 52 do not need to include the tongues 513 and 523. In this case, the engagement portion 44 of the suspender 4 may be inserted through the gap G between the first guide 51 and the second guide 52 by causing elastic deformation of the entire clip 5 such that the through hole 501 expands.

In each of the above-described exemplary embodiments, although the connecting portion 53 includes the pair of bridges 531A and 531B extending across the gap G between the first guide 51 and the second guide 52, the invention is not limited to this. In other words, the connecting portion 53 is not particularly limited as long as the connecting portion 53 is configured to directly or indirectly connect the first guide 51 to the second guide 52.

In each of the above-described exemplary embodiments, although the suspender 4 includes the projection 45, the invention is not limited to this. For example, the suspender 4 may be prevented from being excessively inserted into the clip 5 by bringing the jig hook 46 into contact with the first guide 51 instead of bringing the projection 45 into contact with the first guide 51. Alternatively, the pushing amount of the suspender 4 into the clip 5 may be adjusted by controlling pressing means.

What is claimed is:

1. A clip configured to be placed in a groove of a cushion member, the clip comprising:
   a first guide and a second guide each configured to guide a suspender configured to be attached to a cover member to a gap formed between the first guide and the second guide, at least one of the first guide or the second guide being engageable with an engagement portion of the suspender inserted through the gap; and
   a connecting portion connecting the first guide and the second guide to each other,
   wherein the first guide and the second guide are each placed on a bottom surface of the groove, wherein the first guide comprises a tongue that is elastically deformable toward the bottom surface of the groove, and wherein the tongue has an end surface facing an edge portion of the second guide with the gap interposed therebetween.

2. The clip according to claim 1, wherein the bottom surface of the groove is exposed through the gap between the first guide and the second guide.

3. The clip according to claim 1, wherein a dimension of the end surface of the tongue in a depth direction of the groove is larger than a dimension of the edge portion of the second guide in the depth direction of the groove.

4. The clip according to claim 1, wherein the connecting portion is formed as a pair of bridges each extending across the gap between the first guide and the second guide, and wherein the first guide, the second guide, and the pair of bridges define a through hole in a depth direction of the groove.

5. A cover-member attachment tool comprising:

the clip according to claim 1; and the suspender configured to be attached to the cover member, wherein the suspender comprises a body that is insertable through the gap between the first guide and the second guide, and the engagement portion projecting from the body in a width direction of the groove and that is engageable with at least one of the first guide or the second guide.

6. The cover-member attachment tool according to claim 5, wherein the engagement portion projects from the body toward one side in the width direction of the groove and is inserted between the second guide and the bottom surface of the groove.

7. The cover-member attachment tool according to claim 5, wherein the suspender further comprises a projection projecting from the body and that is configured to be brought into contact with the clip from a side on which the groove is open.

8. A clip assembly comprising:

a plurality of clips according to claim 1 that are arranged in a predetermined direction; and a clip connecting portion connecting the plurality of clips to each other.

9. A cover-member attachment tool comprising:

the clip assembly according to claim 8; and a suspender assembly configured to be attached to the cover member, wherein the suspender assembly comprises a plurality of suspenders corresponding to respective ones of the plurality of clips.

10. A clip configured to be placed in a groove of a cushion member, the clip comprising:

a first guide and a second guide each configured to guide a suspender configured to be attached to a cover member to a gap formed between the first guide and the second guide, at least one of the first guide or the second guide being engageable with an engagement portion of the suspender inserted through the gap;

a connecting portion connecting the first guide and the second guide to each other, the first guide and the second guide being each placed on a bottom surface of the groove, a first leg connected to the first guide and extending toward a side on which the groove is open;

a second leg connected to the second guide and extending toward the side on which the groove is open;

a first claw projecting from an end of the first leg toward the second leg; and a second claw projecting from an end of the second leg toward the first leg.

11. A cover-member attachment tool comprising:

the clip according to claim 10; and the suspender configured to be attached to the cover member, wherein the suspender comprises a body that is insertable through the gap between the first guide and the second guide, and the engagement portion projecting from the body in a width direction of the groove and that is engageable with at least one of the first guide or the second guide.

* * * * *

UNITED STATES PATENT AND TRADEMARK OFFICE
CERTIFICATE OF CORRECTION

| | | |
|---|---|---|
| PATENT NO. | : 12,442,399 B2 | Page 1 of 1 |
| APPLICATION NO. | : 18/456843 | |
| DATED | : October 14, 2025 | |
| INVENTOR(S) | : Takefumi Adachi et al. | |

It is certified that error appears in the above-identified patent and that said Letters Patent is hereby corrected as shown below:

In the Specification

In Column 7, Line 30, delete "clip" and insert -- clip 5 --.

In Column 9, Line 40, delete "clip" and insert -- clip 5 --.

In Column 11, Line 29, delete "clip" and insert -- clip 5 --.

Signed and Sealed this
Sixteenth Day of December, 2025

John A. Squires
*Director of the United States Patent and Trademark Office*